(12) United States Patent
Mechev

(10) Patent No.: US 9,411,324 B2
(45) Date of Patent: Aug. 9, 2016

(54) HOT STRIP MILL CONTROLLER

(71) Applicant: GE Energy Power Conversion Technology Ltd., Warwickshire (GB)

(72) Inventor: Aleksandar Mechev, Shirley (GB)

(73) Assignee: GE Energy Power Conversion Technology Limited, Warwickshire (GB)

( * ) Notice: Subject to any disclaimer, the term of this patent is extended or adjusted under 35 U.S.C. 154(b) by 524 days.

(21) Appl. No.: 13/910,484

(22) Filed: Jun. 5, 2013

(65) Prior Publication Data

US 2013/0331977 A1 Dec. 12, 2013

(30) Foreign Application Priority Data

Jun. 6, 2012 (EP) ..................... 12004318

(51) Int. Cl.
*G05B 13/02* (2006.01)
*B21B 37/50* (2006.01)

(52) U.S. Cl.
CPC ............ *G05B 13/02* (2013.01); *B21B 37/50* (2013.01); *B21B 2265/06* (2013.01); *B21B 2273/02* (2013.01)

(58) Field of Classification Search
None
See application file for complete search history.

(56) References Cited

U.S. PATENT DOCUMENTS

| | | | | |
|---|---|---|---|---|
| 2,192,044 A | * | 2/1940 | Lessmann | B21B 37/50 72/12.4 |
| 3,237,439 A | * | 3/1966 | Torrance | B21B 37/50 72/205 |
| 4,033,492 A | * | 7/1977 | Imai | B21B 37/50 226/25 |
| 4,133,035 A | * | 1/1979 | Grohowski | B65H 54/80 242/362.1 |
| 4,162,624 A | * | 7/1979 | Morooka | B21B 37/50 700/152 |

(Continued)

FOREIGN PATENT DOCUMENTS

| | | |
|---|---|---|
| CN | 1120474 A | 4/1996 |
| CN | 1378487 A | 11/2002 |

(Continued)

OTHER PUBLICATIONS

Choi, I., Rossiter, A., Fleming, P., 2007. A survey of the looper-tension control technology in hot rolling mills, World Congress, vol. 16, Part 1.*

(Continued)

*Primary Examiner* — Kenneth M Lo
*Assistant Examiner* — Christopher E Everett
(74) *Attorney, Agent, or Firm* — WOOD IP LLC

(57) ABSTRACT

The present invention provides a method of controlling the height of a looper in an inter-stand section of a hot strip mill that overcomes the problem of looper instability due to looper inertia without the need for the controller of upstream rollers to have a reduced gain. The inter-stand section of the hot strip mill comprises a pair of upstream rollers driven by a main motor and a looper driven by a looper motor. The method comprises the steps of: calculating a desired speed trim to be applied by the main motor; estimating the inertia of the looper; calculating a torque necessary to overcome the inertia of the looper from the speed trim, the estimated inertia of the looper and a sensitivity calculated from the geometry of the looper; and controlling the main motor to apply the speed trim to the upstream rollers and controlling the looper motor to apply the calculated torque to the looper.

11 Claims, 2 Drawing Sheets

(56) References Cited

U.S. PATENT DOCUMENTS

| | | | | |
|---|---|---|---|---|
| 4,307,591 | A | * | 12/1981 | Peterson ................ B21B 37/50 226/25 |
| 4,379,395 | A | * | 4/1983 | Konishi ................ B21B 37/52 700/152 |
| 4,827,197 | A | * | 5/1989 | Giebeler ................ B04B 9/10 318/3 |
| 4,978,846 | A | * | 12/1990 | Buote ................ G01D 5/341 250/231.13 |
| 5,479,803 | A | * | 1/1996 | Imanari ................ B21B 37/52 700/150 |
| 5,701,774 | A | * | 12/1997 | Imanari ................ B21B 37/52 72/11.4 |
| 6,619,086 | B1 | * | 9/2003 | Ikeda ................ B21B 37/50 700/152 |
| 2012/0324971 | A1 | * | 12/2012 | Simaan ................ B21B 37/50 72/7.4 |

FOREIGN PATENT DOCUMENTS

| | | |
|---|---|---|
| EP | 0710513 A1 | 5/1996 |
| JP | 564306 A | 1/1981 |
| JP | 5886919 A | 5/1983 |
| JP | 0871627 A | 3/1996 |
| JP | 2000140920 A | 5/2000 |

OTHER PUBLICATIONS

Sansal K. Yildiz, Biao Huang, J. Fraser Forbes, Dynamics and variance control of hot mill loopers, Control Engineering Practice, vol. 16, Issue 1, Jan. 2008, pp. 89-100.*

Hearns, G.; Grimble, M.J., Inferential control for rolling mills, in Control Theory and Applications, IEE Proceedings, vol. 147, No. 6, pp. 673-679, Nov. 2000.*

G. Li, F. Janabi-Sharifi, Fuzzy looperless tension control for hot strip rolling, Fuzzy Sets and Systems, vol. 160, Issue 4, Feb. 16, 2009, pp. 521-536.*

Cuzzola, F., A Multivariable and Multi-Objective Approach for the Control of Hot-Strip Mills, Journal of Dynamic Systems Measurement and Control, Dec. 2006, vol. 128, issue 4.*

Hesketh, T.; Yu An Jiang; Clements, D.J.; Butler, D.h.; Van der Laan, R., Controller design for hot strip finishing mills, in Control Systems Technology, IEEE Transactions on , vol. 6, No. 2, pp. 208-219, Mar. 1998.*

European Search Report and Opinion issued in connection with corresponding EP Application No. 12004318.7 on Oct. 24, 2012.

Unofficial English Translation of Chinese Office Action issued in connection with corresponding CN Application No. 201310224116.9 on Jan. 18, 2016.

* cited by examiner

HOT STRIP MILL CONTROLLER

FIELD OF THE INVENTION

The present invention relates to hot strip mills, and in particular to the height control of loopers in hot strip mills.

BACKGROUND OF THE INVENTION

In hot strip mills the strip of product being produced passes through a plurality of rollers. It is important to control the tension applied to the strip because it affects the dimensions and mass flow of the strip. High tension can reduce the width and thickness of a strip and result in poor flatness or a poor edge profile, all of which are generally undesirable. However, high tension can also make the mass flow of the strip more stable, which is generally desirable. Therefore, it is important to apply the correct tension to a strip in order to ensure proper product quality and a stable mass flow.

In order to help control the tension in the strip loopers are used. Loopers comprise looper rolls positioned at the end of looper arms and are positioned in inter-stand sections of a mill, between rollers, such that the strip passes over the looper roll as it passes through the mill. The angle of a looper arm relative to the pass line of the rollers determines the height of the looper roll mounted thereon. Additionally, each looper has an associated looper motor which applies a torque to the looper arm. This torque is transmitted, via the looper arm, to the looper roll, which then applies a force to the strip as a result of the torque. The force applied to the strip as a result of the torque results in a tension in the strip. By controlling the torque the tension in the strip can be controlled to be constant. In a steady-state condition a looper will apply a constant force to a strip passing over it resulting in a constant tension in the strip.

The height of a looper roll is partially determined by the length of strip in the inter-stand section. In particular, the height of a looper roll will increase if the length of strip is increased and the height of a looper roll will decrease if the length of strip is decreased. The rollers at the upstream end of an inter-stand section of the mill are used to control the length of strip in the inter-stand section. If it is necessary to increase the length of strip the speed of the upstream rollers can be increased. Similarly, in order to reduce the length of strip the speed of the upstream rollers is decreased. A controller is used to control the rotational speed of the upstream rollers.

Under normal operating conditions a looper roll will be maintained at a constant height, the upstream rollers will be operated at a constant speed and the tension within the strip will also be constant. However, during abnormal operating conditions the tension in the strip and the height of the looper roll may vary. Abnormal operating conditions include momentary disturbances in the steady-state operation of a mill, such as mass flow imbalance due to variations in strip thickness, hardness or temperature. If the looper roll height changes due to a disturbed mass flow and the torque applied by the looper motor to the looper arm is kept constant the strip tension will change. This is because, for a constant torque applied to a looper arm by the looper motor, the resulting force that is applied by the looper roll to the strip is a function of the angle of the looper arm. Therefore, in order to try and maintain a constant tension in a strip passing through the mill, when the height of the looper roll changes the torque applied by the looper motor to the looper arm is required to be controlled such that the looper roll applies substantially the same force to the strip.

A controller is used to control the tension produced by a looper. This is done by controlling the torque applied by a looper motor. In particular, for any measured angle of the looper arm (which corresponds to the height of the looper roll) a controller will calculate the torque that should be applied by the looper motor in order to produce the correct tension in the strip and will then control the looper motor to apply that torque.

Conventionally, the length of the strip, and therefore the height of the looper rolls in an inter-stand section of a mill is controlled using a proportional-integral-differential (PID) controller that controls a main drive of the upstream rollers on the basis of a measured angle of the looper arm (which corresponds to the height of the looper roll). However, when the speed of the upstream rollers is controlled to increase or decrease the length of strip in an inter-stand section of the mill the height of a looper roll will not change instantaneously. This is due to the inertia of the looper and the looper motor. A tension change is necessary to overcome the looper inertia before the height of the looper roll changes. The resulting delay in the change of height of the looper roll can be significant and cause looper instability. This problem is more pronounced when rolling heavy gauge and/or wide products as such products have an increased inter-stand strip weight. Due to the problem of looper instability, the gain of current controllers of upstream rollers is required to be set at a level that is lower than would otherwise be ideal. This results in the controllers having a relatively low sensitivity to disturbances in the operating conditions of the mill.

In light of the above there is a need for an improved method of controlling the height of a looper in an inter-stand section of hot strip mill that overcomes the problem of looper instability due to looper inertia without the need for the controller of the upstream rollers to have a reduced gain.

SUMMARY OF THE INVENTION

The present invention provides a method of controlling the height of a looper in an inter-stand section of a hot strip mill, the inter-stand section comprising a pair of upstream rollers driven by a main motor and a looper driven by a looper motor; the method comprising the steps of:

calculating a desired speed trim to be applied by the main drive;

estimating the inertia of the looper;

calculating a torque necessary to overcome the inertia of the looper from the speed trim, the estimated inertia of the looper and a sensitivity calculated from the geometry of the looper; and controlling the main motor to apply the speed trim to the upstream rollers and controlling the looper drive to be apply the calculated torque to the looper.

The present invention further provides an inter-stand section of a hot strip mill for processing a strip of product, the inter-stand section comprising a pair of upstream rollers driven by a main motor, a looper driven by a looper motor, and a controller adapted to:

calculate a desired speed trim to be applied by the main motor;

estimate the inertia of the looper;

calculate a torque necessary to overcome the inertia of the looper from the speed trim, the estimated inertia of the looper, and a sensitivity calculated from the geometry of the looper; and control the main motor to apply the speed trim to the upstream rollers and control the looper motor to apply the calculated torque to the looper.

The present invention is advantageous over the prior art as it takes into account the torque necessary to overcome the inertia of the looper when controlling the upstream rollers and the looper motor. Taking the inertia of the looper into account when controlling the system can avoid looper instability and therefore the control can be more sensitive than would otherwise be possible. A particular advantage of the present invention is that it can operate without the need for the controller to have a reduced gain, as is necessary in controllers according to the prior art.

The desired speed trim to be applied by the main motor can be calculated in any manner apparent to the person skilled in the art. In particular, the desired speed trim can be calculated by monitoring the angle of the looper arm in the same manner as in prior art methods for controlling the height of a looper roll in an inter-stand section.

With regards to the present invention, the inertia of the looper is to be understood to be the inertia that is required to be overcome when a looper roll is varied in height. In particular this may include the inertia of the looper roll, the inertia of the looper arm, the inertia of the looper motor and the inertia of any other associated components. The inertia of the looper can be estimated in any manner apparent to the person skilled in the art. It is anticipated that the skilled person would easily be able to estimate, either by calculation or measurement, the inertia of the looper of any given inter-stand section of a hot strip mill.

As an example, the inertia of the looper could be calculated in the following the manner. The inertia is the sum of the inertia of the looper motor and the inertia of the looper arm and roll i.e.:

$$I = I_m + I_a$$

where $I_m$ is the inertia of the looper motor, which will typically be specified by the motor manufacturer, and $I_a$ is the inertia of the looper arm and roll, which can be calculated from basic principles. Specifically, the moment of inertia of an object rotating around an axis is:

$$I = \Sigma m r^2$$

where m is the mass of the object and r is the distance of the object from the rotational axis. Thus for a looper, the mass of the looper is the sum of the mass of the looper arm ($m_a$) and the mass of the looper roll ($m_r$). Hence the inertia of the looper arm and roll is:

$$I_a = m_a r_1^2 + m_r r_2^2$$

As the axis of the looper arm and roll will be a pivot located at an inner end of the looper arm and the looper roll is located at an outer end of the looper arm, $r_2$ will be equal to the length of the looper arm (r). Generally, the mass of the looper arm will be uniformly spread along its length. As a result, the centre of mass of the looper arm will be at the geometrical centre of the looper arm. Therefore, $r_1$ will be equal to half the length of the looper arm. This means, the inertia of the looper arm and the looper roll is:

$$I_a = m_a \left(\frac{r}{2}\right)^2 + m_r r^2$$

As an alternative to calculating the inertia of the looper in the manner set out above, the inertia of the looper can be measured. This can be done by testing the looper when the inter-stand section is empty (i.e. no strip is being passed through the section). Specifically, the looper motor could be controlled to apply a constant torque to the looper arm and the resulting angular acceleration of the looper could be measured by monitoring the looper angle. From the values of the torque and the angular acceleration the inertia of the looper could be determined.

According to the method of the present invention, the sensitivity is understood to be the rate of change of strip length in the inter-stand section as the angle of the looper arm (i.e. height of the looper roll) is varied. The sensitivity of any inter-stand section is dependent upon the specific geometry of that section. It is anticipated that the skilled person would easily be able to determine the sensitivity for any specific inter-stand section. This could be done by either calculation or measurement. An exemplary way of calculating the sensitivity of an inter-stand section from the geometry of that section is set out immediately below. However, it is to be understood that this is utilised only as an example and any other suitable method of determining the sensitivity may be used.

FIG. 1 shows the geometry of a typical inter-stand section 1 of a hot strip mill. The section 1 comprises an upstream pair of rollers 2 at a front end of the section, a downstream pair of rollers 3 at a rear end of the section and a looper 4. A strip of material 5 is passed through the section 1 by the action of the upstream and downstream rollers 2, 3. A suitable tension is maintained in the strip 5 by the combined action of the upstream rollers 2, 3 and the looper 4. In particular, the strip 5 is supported by a looper roll 6 mounted on the end of a looper arm 7. A torque is provided to the looper arm 7 and looper roll 6 by a looper motor 8 mounted at a lower end of the looper arm.

The specific geometry of the inter-stand section 1 is illustrated in FIG. 1. In particular:
L=horizontal length of the inter-stand section
R=length of the looper arm
a=upstream distance of a pivot of the looper arm
y=height of the pass line of the section from the looper arm pivot
r=radius of the looper roll
α=angle of looper arm from horizontal
HD1=upstream distance of centre of looper roll
HD2=downstream distance of centre of looper roll
VD=vertical distance of highest point of strip from the pass line of the section The sensitivity of the inter-stand section 1 can be calculated from the variables above. First, as will be readily appreciated from FIG. 1, the total length (Lis) of the strip 5 in the inter-stand section 1 can be calculated from VD, HD1 and HD2 as follows:

$$Lis = \sqrt{VD^2 + HD1^2} + \sqrt{VD^2 + HD2^2}$$

Furthermore, each of VD, HD1 and HD2 can each be calculated from the set dimensions (L, R, a and y) of the inter-stand section 1 and the angle of the looper arm (in degrees) 7 in the following manner:

$$VD = \sin\left(\alpha \frac{\pi}{180}\right)R - y + r$$

$$HD1 = \cos\left(\alpha \frac{\pi}{180}\right)R + a$$

$$HD2 = L - 1 - \cos\left(\alpha \frac{\pi}{180}\right)R$$

Thus, as L, R, a and r will be known, or can be easily measured, for any given inter-stand section the relationship between the total length of strip (Lis) in the inter-stand section 1 and the angle of the looper arm 7 can be easily determined.

The sensitivity of the inter-stand section 1 is the differential of the relationship between the total length of the strip and the angle of the looper arm 7. That is, $dL_{is}$ is a function of the angle of the looper arm 7:

$$dL_{is} = \frac{f(\alpha + \Delta\alpha) - f(\alpha)}{\Delta\alpha}$$

Hence, the sensitivity $$\frac{d\alpha}{dL_{is}}$$

is also a function of the angle of the looper arm 7. In applications of the present invention the value of $\Delta\alpha$ will be determined based upon the resolution at which the angle of the looper arm 7 can be measured by any monitoring means used to measure the angle of the looper arm 7. Typically, the angle of the looper arm 7 will be measured using a feedback encoder, although any other suitable monitoring means may be used. The minimum resolution of the monitoring means may define $\Delta\alpha$. For example, if a feedback encoder of a specific inter-stand section has a minimum resolution of 0.075°, then $\Delta\alpha$ for that section, and the method used to control that section would also be 0.075°.

The torque necessary to overcome the inertia of the looper is calculated from the speed trim, the estimated inertia of the looper and the sensitivity. This can be done in any manner apparent to a person skilled in the art.

In a preferred embodiment of the invention the torque is determined from the desired speed trim using a transfer function of a first order lag to model the response of the main drive to an applied speed trim. After the transfer function has been applied to the desired speed trim the output may then be differentiated and then multiplied by the sensitivity and the estimated inertia of the looper in order to calculate the torque. For example, the transfer function may be:

$$\frac{1}{(T_m + T_{adv})s + 1}$$

where $T_m$=time constant for the main drive
$T_{adv}$=advance time used to apply the speed trim
s=Laplace transform variable The time constant for the main drive will be a manufacturer defined (constant) parameter. The advance time used to apply the speed trim is a tunable parameter that the skilled person will be able to optimise for any given application of the method of the present invention, dependent upon the limitations of the system used to implement the method.

An example of the application of this transfer function to calculate a torque is illustrated in FIG. 2. In this Figure the output of the transfer function is differentiated to calculate the acceleration required for the desired speed trim. This linear acceleration is then multiplied by the sensitivity to produce a desired angular acceleration of the looper arm. The angular acceleration is then converted from degrees to radians and then multiplied by the looper inertia to produce a value for the torque that needs to be applied to the looper arm by the looper motor. After this has been calculated the main motor to apply the desired speed trim to the upstream rollers and the looper motor will be controlled to apply the torque to the looper motor.

It is to be noted that the transfer function discussed above and illustrated in FIG. 2 is given as an example only and any other suitable transfer function of first order lag may be used in preference to this transfer function. Furthermore, the calculation of the torque from the desired speed trim, sensitivity and looper inertia may be carried out in any manner apparent to the skilled person Further features and advantages of the present invention will be apparent from the preferred embodiment of the invention, which is discussed below.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
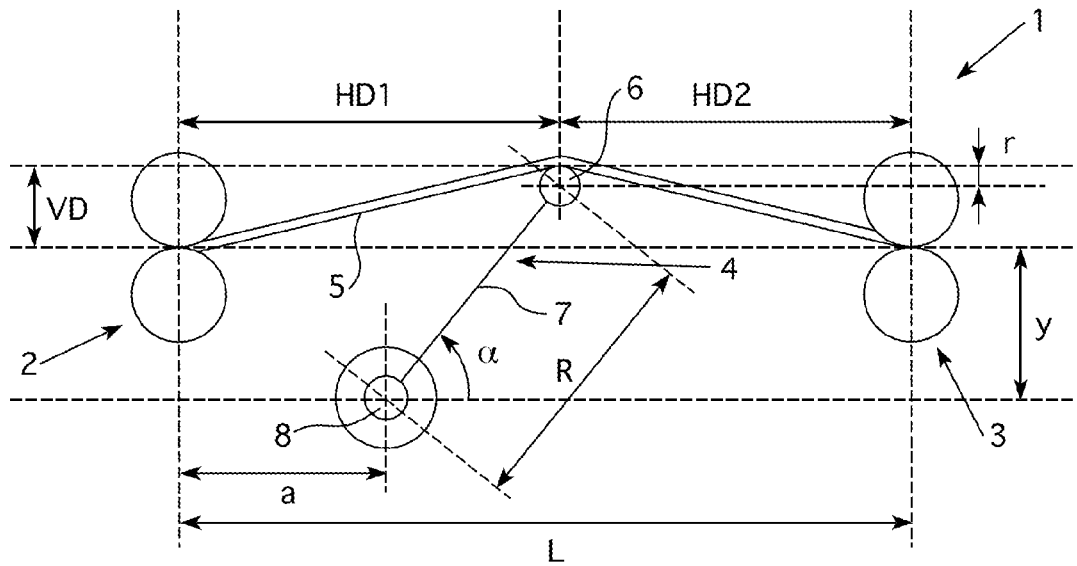
FIG. 1 is a first schematic of an inter-stand section of a typical hot strip mill showing the dimensions of the strip mill.
Figure 3:
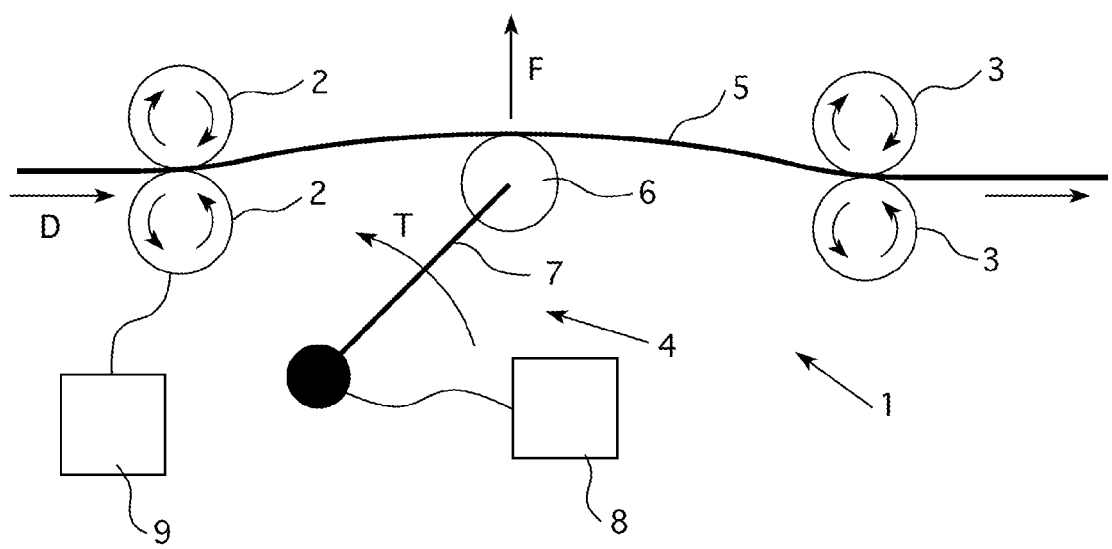
FIG. 3 is a second schematic of an inter-stand section of a typical hot strip mill.

A typical inter-stand section 1 of a hot-strip mill is schematically represented in FIGS. 1 and 3. The section 1 comprises an upstream pair of rollers 2 at an upstream end of the section, a downstream pair of rollers 3 at a downstream end of the section and a looper 4. The looper 4 comprises a looper roll 6 mounted at an end of a looper arm 7. The looper arm 7 being pivoted at the other end to the looper roll 6 and having a looper motor 8 at the pivot for applying a torque to the looper arm. The upstream rollers 2 are driven by a main motor 9. When in use, the upstream rollers 2 are driven by the main motor 9 to propel a strip of material 5 over the looper roll 6 and through the downstream rollers 3. The force applied by the upstream rollers is indicated by the arrow labelled "D" in FIG. 3. As discussed in the Background of Invention section, suitable tension is maintained in the strip 5 by the action of the combined action of the upstream rollers 2 and the looper roll 6. In particular, the looper motor 8 applies a torque to the looper arm 7, as indicated by the arrow labelled "T" in FIG. 3. This torque is transmitted via the looper roll 6 to the strip 5 to produce a substantially vertical force on the strip, as indicated by the arrow labelled "F" in FIG. 3. Both the main motor 9 and the looper motor 8 are controlled by a controller (not shown).

During normal steady-state operation the upstream rollers 2 will be controlled to provide a constant force D to drive the strip 5 through the section 1 and the looper motor 8 will be controlled to provide a constant torque T to the looper arm 7. This will result in the strip being subject to a constant tension. However, abnormal operating conditions, such as mass flow unbalance due to variations in the thickness, hardness or temperature of the strip 5 can cause the tension in the strip to vary. If this happens, the height of the looper roll 6, and therefore the force F applied by the looper roll 6 to the strip 5, will also change. In order to correct this and to return the tension in the strip 5 to a desired value, a speed trim is applied to the upstream rollers 2 by controlling the main motor appropriately and simultaneously the method of the present invention is used to vary the torque T applied by the looper motor 8 to the looper arm 7. Changes in tension of the strip 5 and consequent changes in height of the looper roll 6 are monitored by monitoring the angle of the looper arm 7 using an encoder (not shown).

Figure 2:
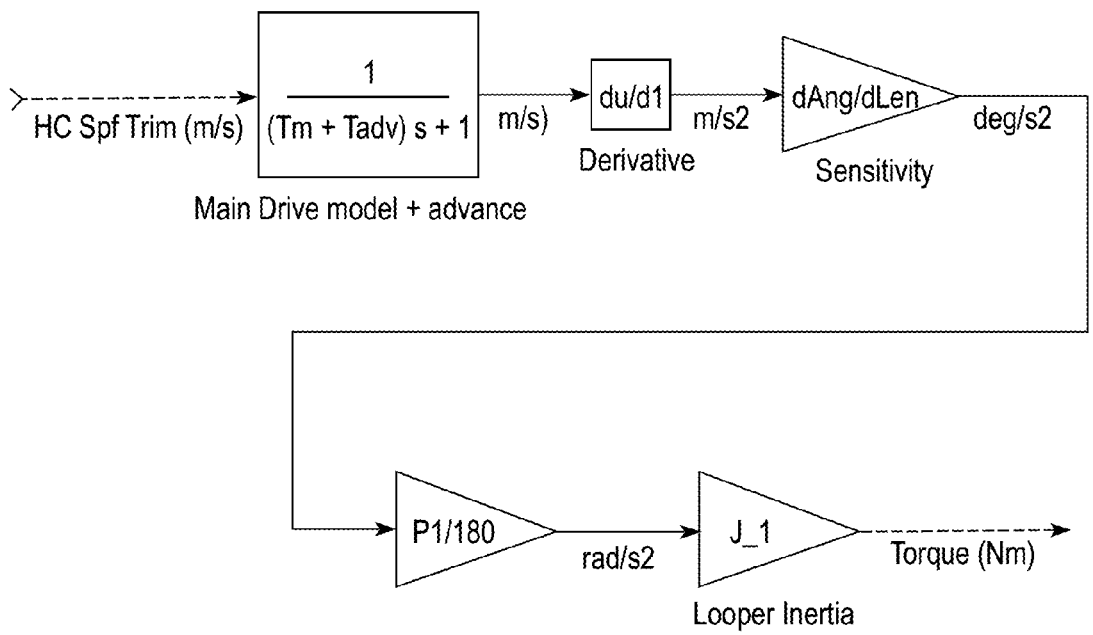
FIG. 2 is a diagram showing the calculation of a torque to be applied to a looper arm from the desired speed trim to be applied to a main drive of an inter-stand section.

The torque T to be applied by the looper motor to the looper arm 7 is determined by first calculating the desired speed trim to be applied to the upstream rollers 2 in a conventional manner. The desired speed trim is then input into the formula shown in FIG. 2 and the torque T to be applied by the looper motor 8, which takes into account the sensitivity and inertia of the looper 4, is calculated. The desired speed trim and torque T are then applied simultaneously. The controller will repeatedly carry out this process until the tension in the strip 5 is corrected and constant and the looper roll 6 is at the desired height i.e. when the desired speed trim becomes zero.

By taking into account the inertia and sensitivity of the looper 6 when varying the torque applied by the looper motor 8 unwanted oscillations and over or under corrections of the height of the looper roll 6, and hence the tension in the strip 5, can be avoided. As a result, it is anticipated that after any disturbances the application of the method of the present invention will result in constant and desired tension in the strip 5 being regained much more quickly than would otherwise be possible.

What is claimed is:

1. A method of controlling a height of a looper in an inter-stand section of a hot strip mill, the inter-stand section comprising a pair of upstream rollers driven by a main motor and the looper driven by a looper motor;

the method comprising:
    calculating a desired speed trim to be applied by the main motor;
    estimating an inertia of the looper by calculating an inertia of the looper motor, a looper arm and a looper roll associated with the looper;
    monitoring an angle of the looper arm;
    calculating a torque to be applied to the looper motor based on the speed trim, the inertia of the looper, and a sensitivity calculated from a geometry of the looper, wherein the sensitivity is a rate of change of a strip length in the inter-stand section as the angle of the looper arm is varied; and
    controlling the main motor to apply the speed trim to the upstream rollers and controlling the looper motor to apply the calculated torque to the looper, simultaneously.

2. The method of claim 1, wherein the calculated torque is determined from the desired speed trim using a transfer function of first order lag to model a response of the main motor to an applied speed trim.

3. The method of claim 2, wherein the transfer function is of the form:

$$\frac{1}{(T_m + T_{adv})s + 1}$$

where $T_m$=time constant for the main motor
    $T_{adv}$=advance time used to apply the speed trim
    s=Laplace transform variable.

4. The method of claim 2, wherein an output of the transfer function is differentiated and multiplied by the sensitivity and the inertia of the looper to calculate the torque.

5. The method of claim 1, wherein the inertia of the looper is calculated from a mass and geometry of the looper.

6. The method of claim 1, wherein the inertia of the looper is measured by monitoring an angular acceleration of the looper when a constant torque is applied thereto.

7. The method of claim 1, wherein the sensitivity is calculated from a geometry of the inter-stand section wherein the geometry is determined by calculating a horizontal length of the inter-stand section, a vertical distance of a highest point of strip from a pass line of the inter-stand section and the geometry of the looper roll and the looper arm.

8. The method of claim 1, wherein the sensitivity is measured from real-life monitoring of the inter-stand section during operation.

9. The method of claim 1, wherein the desired speed trim is calculated by monitoring the angle of the looper arm of the looper using a feedback encoder.

10. An inter-stand section of a hot strip mill for processing a strip of product, the inter-stand section comprising:
    a pair of upstream rollers driven by a main motor, a looper driven by a looper motor, and
    a controller adapted to:
    calculate a desired speed trim to be applied by the main motor;
    estimate an inertia of the looper by calculating an inertia of the looper motor, a looper arm and a looper roll associated with the looper;
    monitoring an angle of the looper arm;
    calculate a torque to be applied to the looper motor based on from the speed trim, the inertia of the looper, and a sensitivity calculated from a geometry of the looper wherein the sensitivity is a rate of change of a strip length in the inter-stand section as the angle of the looper arm is varied; and
    control the main motor to apply the speed trim to the upstream rollers and control the looper motor to apply the calculated torque to the looper, simultaneously.

11. The inter-stand section of claim 10, wherein the looper motor applies a torque to the looper arm.

* * * * *